(12) United States Patent
Trammell

(10) Patent No.: US 7,566,997 B2
(45) Date of Patent: Jul. 28, 2009

(54) GAS BEARING SYSTEM

(75) Inventor: Glenn Sterling Trammell, Fort Smith, AR (US)

(73) Assignee: Baldor Electric Company, Fort Smith, AR (US)

( * ) Notice: Subject to any disclaimer, the term of this patent is extended or adjusted under 35 U.S.C. 154(b) by 193 days.

(21) Appl. No.: 11/694,195

(22) Filed: Mar. 30, 2007

(65) Prior Publication Data

US 2008/0240630 A1  Oct. 2, 2008

(51) Int. Cl.
*H02K 41/00* (2006.01)
(52) U.S. Cl. .......................... 310/12; 384/12
(58) Field of Classification Search .................. 310/12; 384/12; 74/89; 318/135
See application file for complete search history.

(56) References Cited

U.S. PATENT DOCUMENTS

| | | | |
|---|---|---|---|
| RE27,436 E | 7/1972 | Sawyer | |
| 3,851,196 A * | 11/1974 | Hinds | 310/12 |
| 3,950,663 A | 4/1976 | Mead | |
| 4,078,192 A | 3/1978 | Fultz | |
| 4,315,171 A | 2/1982 | Schaeffer | |
| 4,335,338 A | 6/1982 | Sawyer | |
| 4,404,509 A | 9/1983 | Hartwig | |
| 4,509,001 A | 4/1985 | Wakabayashi et al. | |
| 4,725,750 A | 2/1988 | Welch | |
| 4,749,921 A | 6/1988 | Chitayat | |
| 4,757,220 A | 7/1988 | Pouillang | |
| 4,887,914 A * | 12/1989 | Lin et al. | 384/12 |
| 4,912,746 A | 3/1990 | Oishi | |
| 4,972,108 A | 11/1990 | Venturini | |
| 5,334,892 A * | 8/1994 | Chitayat | 310/12 |
| 5,642,013 A | 6/1997 | Wavre | |
| 5,723,917 A | 3/1998 | Chitayat | |
| 5,841,207 A * | 11/1998 | Correns et al. | 310/12 |
| 5,910,691 A | 6/1999 | Wavre | |
| 5,965,962 A | 10/1999 | Hinds | |
| 6,160,327 A | 12/2000 | Wang | |
| 6,215,260 B1 | 4/2001 | Hinds | |
| 6,242,822 B1 | 6/2001 | Strothmann | |
| 6,522,035 B1 | 2/2003 | Smit | |
| 6,798,089 B1 | 9/2004 | Smit | |
| 6,954,009 B2 | 10/2005 | Nakamura et al. | |
| 7,133,115 B2 | 11/2006 | Nawata et al. | |
| 2004/0263000 A1 | 12/2004 | Vreugdewater et al. | |
| 2005/0211920 A1 | 9/2005 | Shibata | |

* cited by examiner

*Primary Examiner*—Michael C Zarroli
(74) *Attorney, Agent, or Firm*—Thompson Coburn LLP; Matthew J. Himich

(57) ABSTRACT

A linear motor device has a gas bearing and comprises a platen and a motor stack with a bottom face positionable above the platen. The motor stack has a bottom face with a recessed gas pocket. The linear motor gas bearing has a gas introduced from the motor stack into the recess pocket and flowing between the platen and the bottom face of the stack.

32 Claims, 3 Drawing Sheets

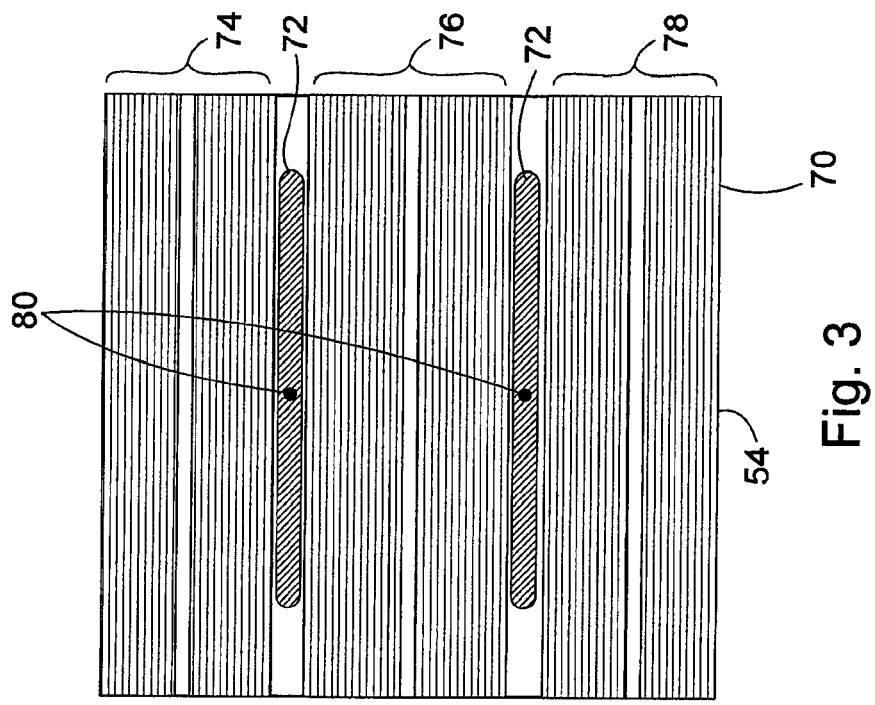
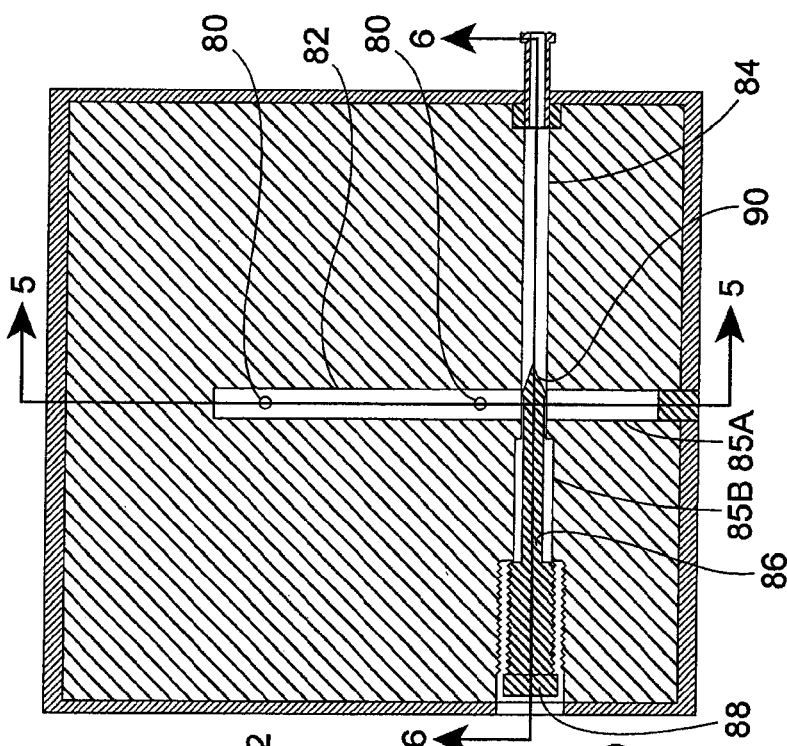
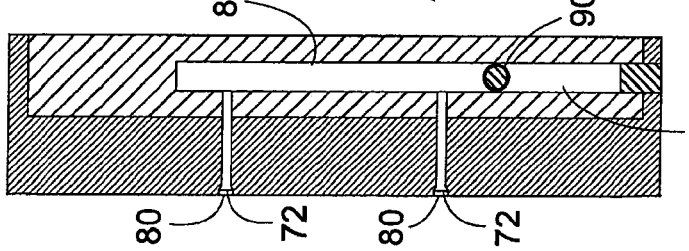
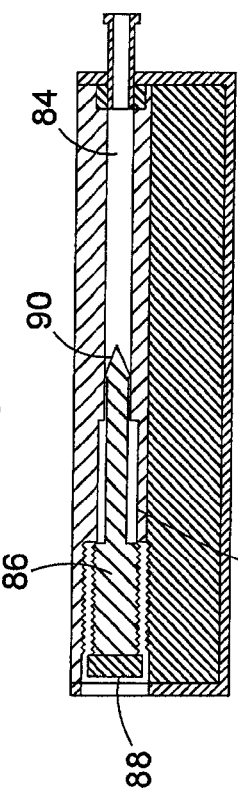
Fig. 3
Fig. 4
Fig. 5
Fig. 6

GAS BEARING SYSTEM

FIELD OF THE INVENTION

This disclosure relates to a linear motion device with an improved gas bearing construction.

BACKGROUND OF THE INVENTION

Conventional dual axis linear stepper motors are provided with an air bearing to support a housing of the motor stacks above a platen. The air bearing is formed by directing pressurized air through the housing and into the space between the housing and the platen via a system of ports formed on the bottom surface of the housing. Slots communicating with the ports are also provided on the bottom surface of the housing to evenly distribute the air under the housing. Because the motor stacks are located on the outer corners of the housing and the housing is flexible, the housing tends to bow under the magnetic pull of the stacks. This resulting bowing reduces the air gap around the peripheral edges of the housing while increasing the air gap in the center of the housing. This bowing of the housing allows the air to accumulate in the center of the housing, further increasing the problem. These phenomena causes various problems with motor performance and alignment, and imposes restrictions on housing/motor stack construction, and encoder placement and gap.

SUMMARY OF THE INVENTION

The embodiments disclosed herein overcome the drawbacks of the prior art by providing an improved gas bearing system. In accordance with one aspect of the invention, a linear motion device has a platen and a motor stack positionable above the platen. The motor stack has a bottom face with a recessed gas pocket. The linear motion device further comprises a gas bearing sustained by a gas flowing through the motor stack into the recessed gas pocket and between the platen and the bottom face of the motor stack.

In another aspect of the invention, a linear motion device is provided with a platen and a housing extending over the platen. A motor stack is mounted in the housing and the motor stack has a bottom face with a recessed gas pocket formed therein. A gas bearing comprises a pressurized gas flowing through the motor stack into the recessed pocket and between the platen and the bottom face of the motor stack and the bottom surface of the housing.

Another aspect of the invention comprises a method where a motor stack is provided having a bottom face with a recessed gas pocket therein. The motor stack has an internal passage in communication with the gas pocket. In accordance with the steps of the method, the stack bottom face is positioned over a platen. Gas is directed from a gas source into the motor stack internal passage and into the gas pocket. The motor stack is balanced above the platen with the pressurized gas flowing in the gas pocket and between the bottom face of the motor stack and the platen.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in the formal part of the specification, illustrate the embodiments of the disclosure and together with the description serve to explain the principles of the disclosure.

FIG. 3 shows an enlargement of a bottom face of the motor stack taken from detail area 3-3 of FIG. 2;

FIG. 4 shows a cross-sectional view of a motor stack;

FIG. 5 shows a left side cross-sectional view of the motor stack taken along lines 5-5 of FIG. 4; and FIG. 6 shows a front cross-sectional view of the motor stack taken along lines 6-6 of FIG. 4.

DETAILED DESCRIPTION OF THE PREFERRED EMBODIMENT

Figure 1:
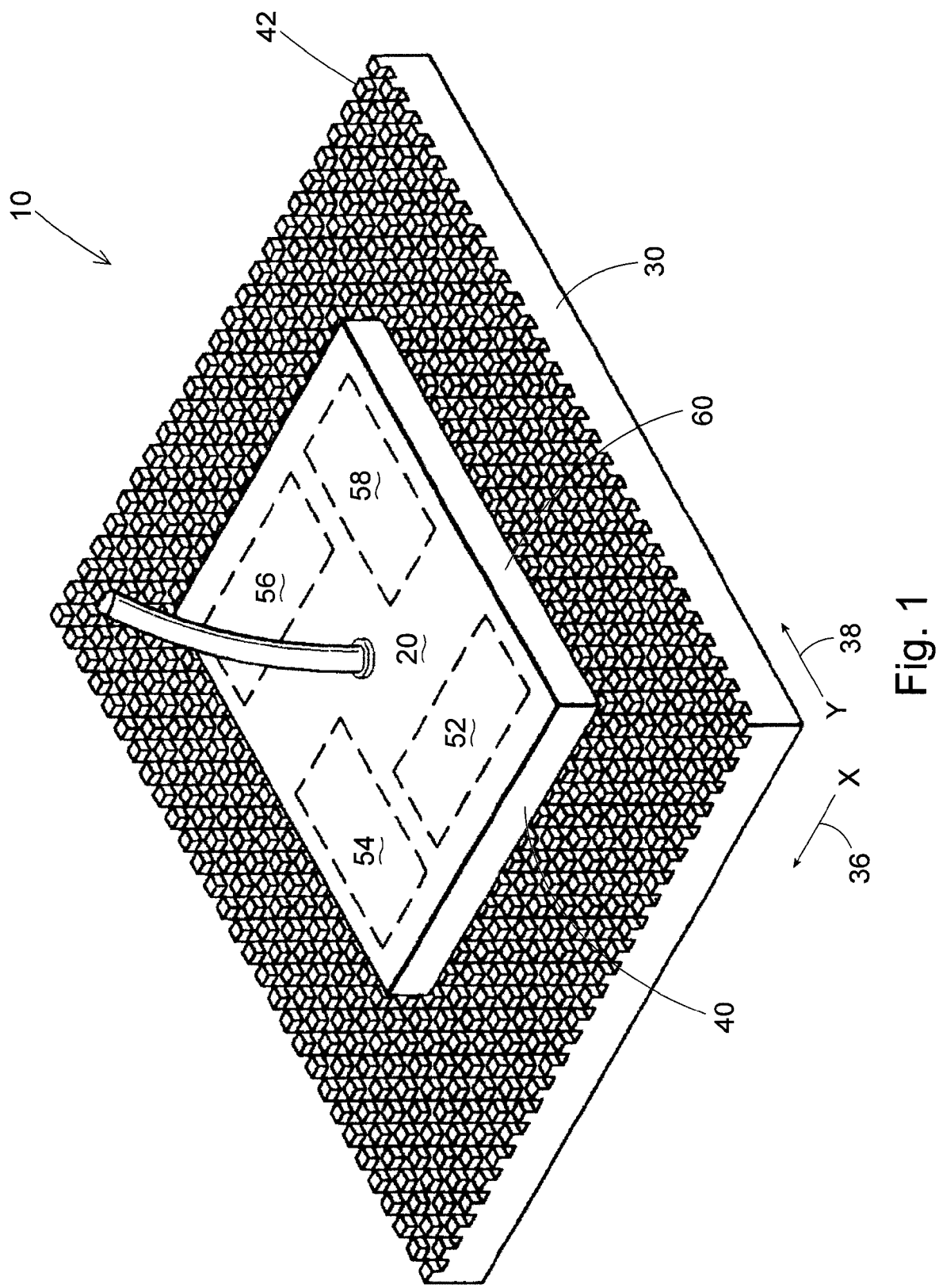
FIG. 1 illustrates a linear motion device comprising a forcer positionable over a platen in x and y directions.

Referring to the accompanying drawings in which like reference numbers indicate like elements, FIG. 1 illustrates the general arrangement of the linear motion device 10 further described herein. The device 10 comprises a forcer 20 positionable above a platen 30 in x and y directions 36, 38 with a gas bearing 40 therebetween. The platen 30 has a plurality of teeth 42 having a sufficient magnetic permeability so that the teeth respond to magnetic fields from the forcer to create motion for the forcer. The spacing between the teeth of the platen may be filled with a non-magnetic filler, and the gas bearing surface of the platen may be lapped for flatness. The platen 30 provides a return path for flux generated at the forcer 20, thereby allowing the forcer to translate across the platen in response to the magnetic fields generated by motor stacks 52,54,56,58 in a housing 60. In the exemplary embodiment shown in FIG. 1, the forcer 20 includes the housing 60 with four motor stacks 52,54,56,58 disposed in each corner of the housing for generating motion in the x and y directions 36, 38 above the platen. The housing is generally a thin section aluminum plate having a rectangular shape with four generally square mounts for securing the motor stacks thereto with an epoxy. It should be appreciated that other configurations may be used, including the elimination of the housing, and the number of motor stacks and the shape of the platen may be varied depending upon the application, and the motion and direction requirements of the application.

Figure 2:
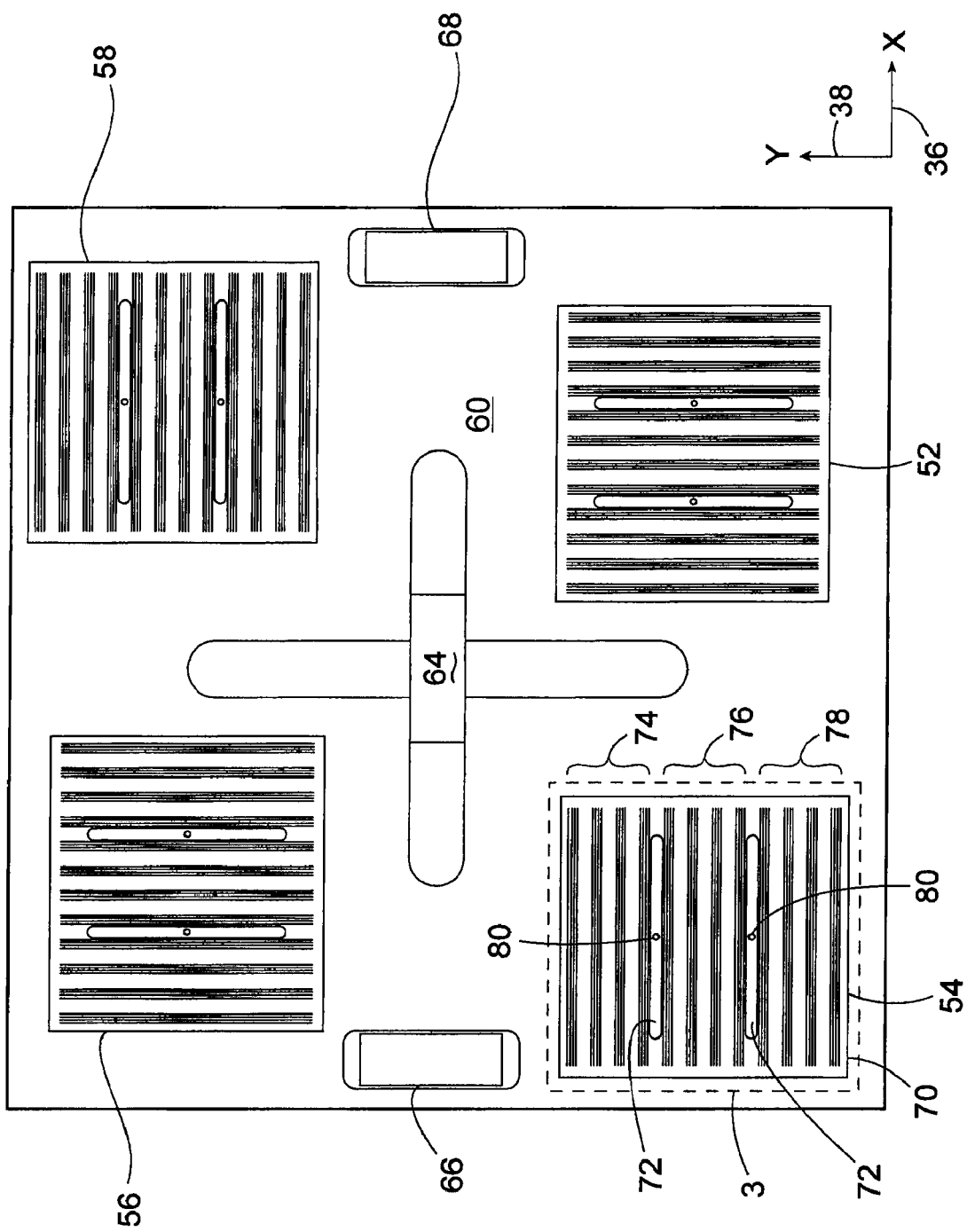
FIG. 2 shows a bottom surface of a housing of the forcer of FIG. 1 along with bottom faces of four motor stacks mounted in the housing.

FIG. 2 shows greater detail of an underside or bottom surface 62 of the housing 60 of the exemplary embodiment. One motor stack is mounted in each of the four corners of the generally square housing. The motor stacks each have a bottom face with a plurality of teeth that magnetically couple with the platen teeth to effect desired motion across the platen. The motor stacks each have windings which are selectively energized to generate a translating magnetic force in both the x and y directions as desired, as is known in the art. For motion control of the forcer, the housing bottom surface is provided with a system of encoders. A center encoder 64 is located in the center of the housing and used for controlling motion of the top left and bottom right stacks 52,56 to produce motion in the x direction 36 across the platen (left and right in FIG. 2). A left encoder 66 is used to provide motion control for the bottom left stack 54 and a right encoder 68 is used to provide motion control for the top right 58. The bottom left and top right stacks 54,58 together produce motion in the y direction 38 across the platen (up and down in FIG. 2). The left and right encoders 66,68 together may be used to limit twisting of the housing as it traverses across the platen since there is no external rail or mechanical bearing system to keep the housing stable. The platen teeth 42 may be used as a grid for the encoders to read as an encoder scale.

FIG. 3 shows greater detail of a bottom face 70 and a recessed gas pocket 72 of the motor stack. In the exemplary embodiment, the motor stack comprises a three-phase motor with three sets 74,76,78 of stack teeth extending across a bottom face 70 of the stack. Each set of teeth corresponds to a phase of the motor. In other embodiments there can be single or polyphase arrangements of stacks. The motor may also comprise a stepper motor or a servo motor. The motor is not restricted to dual axis servos or steppers but also includes single axis motors. The recessed gas pocket 72 is provided adjacent each set of teeth and extends across the bottom face 70 to evenly distribute gas below the motor stack. The gas is introduced into the gas pocket via an orifice 80 leading into an interior of the motor stack. The gas pocket may be machined into an epoxy layer on the bottom face of the stack.

Referring to FIGS. 4-6, the motor stack has an internal passage 82 communicating with a gas supply inlet 84 that supplies the gas to the gas bearing 40. To facilitate manufacturing, the internal passage 82 comprises a bore 85A extending from one side face of the motor stack into the interior of the motor stack. The bore 85A is then plugged on the side face to set the flow path through the motor stack. The gas supply inlet 84 comprises a second bore 85B extending from an adjacent side face through the motor stack interior and intersecting with the first bore 85A. Preferably, the bores 85A, 85B are arranged in the motor stack adjacent heat sink materials associated with the coils and magnetic materials of the motor stack to enhance cooling of the stack. A circuitous path through the motor stack may also be employed to provide additional cooling. A needle valve 86 with an operator 88 externally accessible from a side of the motor stack is arranged in the second bore 85B opposite the gas supply inlet 84. A valve member 90 of the needle valve is positionable in the second bore 85B adjacent the intersection with the first bore 85A to regulate the flow of gas from the inlet to the interior passage. A pressurized gas, such as air, is introduced into the stack at the inlet where it flows through the passage into orifices and into the recessed gas pocket to create the gas bearing that elevates the stack above the platen.

This construction assists in manufacturing, where pressurized gas is provided to the motor stack and the motor stack is floated above the platen. The stack may be energized to allow electromechanical alignment with the platen in both the x and y directions prior to mounting of the stack in the housing, thereby reducing manufacturing time and errors when using mechanical devices like optical comparators or VCMs. Operation of the needle valve further assists manufacturing, as it allows for the adjustment of the height of the stack above the platen. In a multiple-stack housing, the needle valve of each stack may be independently and precisely set, thereby allowing each stack to be independently balanced and aligned with the platen before securing to the housing. This method of alignment of each stack allows the motor stacks to be more perpendicular, parallel and in phase to each other, thereby reducing the amount of twisting of the housing during operation. This lack of twist is beneficial when using multiple encoders mounted 90 degrees to each other that are trying to distinguish the effect of a given stack's motion and its corresponding encoder's feedback. The independent nature of each stack also allows the housing to be made with openings, for encoders, or for mounting stacks in a non-restrictive manner which increases manufacturing flexibility. Further, because the stacks act independently of the housing, bowing of the housing is reduced thereby allowing the stacks to track flatter and lower to the platen. This reduction in gap and gap variation allows for a stiffer air bearing, higher force capacity and less gas consumption.

The gas flowing through the stack improves cooling of the stack, and also improves the flow distribution of air across the platen thereby reducing inducted heat generated at the face of the platen due to the magnetic fields moving back and forth through the steel in the platen. The needle valve also may be adjusted to reduce gas consumption and turbulence from gas exiting the motor and affecting end users processes. A cooler more thermally stable platen provides greater accuracy for the encoders in the forcer that are reading the grid of teeth on the platen as an encoder scale. Introducing gas through the stack enables the use of encoders on the housing, which in turn allows the use of servo motors rather than stepper motors. Servo motors reduce energy requirements and consequently create less heat. Because the gas pocket is formed on the stack bottom face and the gas bearing is primarily created thereunder, the housing may be vented to reduce gas build-up under the housing, thereby reducing distortion of the housing.

The embodiments were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their legal equivalents.

What is claimed is:
1. A linear motor comprising:
a platen,
a motor stack having stack teeth and windings adapted to produce a magnetic field sufficient to magnetically couple the motor stack to the platen, the stack teeth defining an outer periphery of the motor stack, the motor stack having an internal passage adjacent the windings, the motor stack having a bottom face positionable above the platen wherein the motor stack bottom face has a recessed gas pocket, and
a gas bearing comprising a gas introduced from the motor stack into the recessed pocket and flowing between the platen and the bottom face of the stack;
wherein the motor stack is operatively connected to a gas source supplying gas to the recessed gas pocket; and
wherein the motor stack internal passage directs the gas from the gas source to the recessed gas pocket.

2. The linear motor of claim 1, wherein the motor stack internal passage has a needle valve disposed therein for regulating the flow of the gas to the recessed pocket.

3. The linear motor of claim 1, wherein the stack comprises a polyphase motor.

4. The linear motor of claim 1, wherein the bottom face of the stack comprises sets of teeth, each set of teeth corresponding to a phase of the motor, and the recessed gas pocket is disposed between each adjacent set of teeth.

5. The linear motor of claim 1, wherein the stack comprises a servo motor.

6. The linear motor of claim 1, wherein the gas introduced from the motor stack into the recessed pocket flows through the stack internal passage in a manner sufficient to cool the stack.

7. The linear motor of claim 1, wherein the motor is a single axis motor.

8. The linear motor of claim 1, wherein the bottom face of the stack comprises sets of teeth, each set of teeth corresponding to a phase of the motor and defining an outer periphery of the motor.

9. The method of claim 1, wherein the gas bearing for the linear motor is formed solely under the bottom face of the motor stack.

10. A linear motor comprising:
a platen,
a housing having a bottom surface extending over the platen,
a motor stack having stack teeth and windings adapted to produce a magnetic field sufficient to magnetically couple the motor stack to the platen, the motor stack having an internal passage adjacent to the windings, the stack teeth defining an outer periphery of the motor stack with the motor stack being mounted in the housing around the outer periphery of the motor stack wherein the motor stack has a bottom face with a recessed gas pocket formed therein, and
a gas bearing comprising a pressurized gas introduced from the motor stack into the recessed pocket and flowing between the platen, the bottom face of the stack and the bottom surface of the housing.

11. The linear motor of claim 10, wherein the motor stack has an internal passage in communication with a gas supply and the recessed pocket.

12. The linear motor of claim 11, wherein the internal passage includes a needle valve.

13. The linear motor of claim 10, wherein the stack comprises a stepper motor.

14. The linear motor of claim 10, wherein the bottom face of the stack comprises sets of teeth, each set of teeth corresponding to a phase of the stack motor, and the recessed gas pocket is disposed between each adjacent set of teeth.

15. The linear motor of claim 10, wherein the housing bottom face has an encoder.

16. The linear motor of claim 10, wherein the housing bottom face has an encoder in the center of the housing.

17. The linear motor of claim 10, wherein the motor is a dual axis motor.

18. A linear motor comprising:
a platen;
a housing having a bottom surface extending over the platen;
a motor stack mounted in the housing wherein the motor stack has a bottom face with a recessed gas pocket formed therein;
a gas bearing comprising a pressurized gas introduced from the motor stack into the recessed pocket and flowing between the platen, the bottom face of the stack and the bottom surface of the housing; and
wherein the motor stack has an internal passage in communication with a gas supply and the recessed pocket;
wherein the internal passage includes a needle valve; and
wherein the needle valve has an operator positioned in a bore extending from a side of the motor stack.

19. A method comprising:
providing a platen;
providing a motor stack, the motor stack having stack teeth and windings adapted to produce a magnetic field sufficient to magnetically couple the motor stack to the platen, the stack teeth defining an outer periphery of the motor stack, the motor stack having an internal passage adjacent the windings, the motor stack having a bottom face with a recessed gas pocket therein and an internal passage in communication with the gas pocket, the motor stack internal passage positioned adjacent to the windings;
directing a gas from a gas source into the stack internal passage and into the recessed gas pocket; and
balancing the stack above the platen with the pressurized gas in the recessed gas pocket by operating the needle valve.

20. The method of claim 19 further comprising:
providing a housing in which a stack can be mounted;
electromechanically aligning the stack with the platen; and
securing the stack within the housing around the outer periphery of the motor stack once the stack is aligned with the platen.

21. The method of claim 19, wherein motor stack comprises a servo motor.

22. The method of claim 19, further comprising operating the needle valve to regulate the flow of gas into the stack recessed gas pocket to position the stack above the platen a selected distance.

23. The method of claim 19, further comprising energizing the stack before aligning the stack to the platen.

24. The method of claim 23, further comprising directing sufficient gas from the gas source into the stack to cool the stack.

25. The method of claim 20, wherein the step of providing the housing includes providing an encoder mounted on a bottom surface of the housing.

26. The method of claim 25, wherein the step of providing the encoder mounted on the bottom surface of the housing includes mounting the encoder in a center of the housing.

27. The method of claim 25, wherein the step of providing the housing includes venting the housing.

28. The method of claim 19, further comprising regulating the flow of gas into the stack recessed gas pocket to selectively adjust a level of turbulence around the motor from gas exiting the motor.

29. The method of claim 19, further comprising selectively regulating the flow of gas into the stack recessed gas pocket to position the stack above the platen to reduce gas consumption.

30. The method of claim 19, wherein the motor stack is adapted to travel in a single axis across the platen.

31. The method of claim 19, further comprising forming a gas bearing for the linear motor solely under the bottom face of the motor stack.

32. The method of claim 20, further comprising directing pressurized gas away from the housing to centralize the gas bearing under the motor stack bottom face.

* * * * *